(12) United States Patent
Kutscher et al.

(10) Patent No.: US 6,446,980 B1
(45) Date of Patent: Sep. 10, 2002

(54) DEVICE FOR DETERMINING THE DISTANCE BETWEEN VEHICLE BODY AND VEHICLE WHEEL

(75) Inventors: Eberhard Kutscher, Dettenhausen; Hans-Rudolf Steinert, Blitz, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/498,441

(22) Filed: Feb. 4, 2000

(30) Foreign Application Priority Data

Feb. 6, 1999 (DE) .......................... 199 04 908

(51) Int. Cl.[7] .................................................. B60G 17/01
(52) U.S. Cl. .............................. 280/5.508; 280/5.514; 280/6.16; 701/37; 701/38
(58) Field of Search ..................... 280/5.508, 5.514, 280/6.16, 6.159; 701/37, 38

(56) References Cited

U.S. PATENT DOCUMENTS

| 4,618,156 A | * | 10/1986 | Kato et al. .................. 280/6 R |
| 4,858,331 A | | 8/1989 | Maus |
| 5,347,457 A | * | 9/1994 | Tanaka et al. .......... 364/424.05 |
| 5,787,370 A | * | 7/1998 | Kutscher et al. ............... 701/49 |
| 5,825,284 A | | 10/1998 | Dunwoody et al. |
| 6,073,070 A | * | 6/2000 | Diekans ....................... 701/50 |
| 6,116,618 A | * | 9/2000 | Shono et al. ............ 280/5.501 |

FOREIGN PATENT DOCUMENTS

| DE | 3134115 C2 | 8/1981 |
| DE | 196 45 897 A1 | 11/1996 |
| DE | 19634505 | 2/2000 |
| EP | 0318139 | 2/1999 |

* cited by examiner

*Primary Examiner*—Kenneth R. Rice
*Assistant Examiner*—Christopher Buchanan
(74) *Attorney, Agent, or Firm*—Crowell & Moring LLP (57) ABSTRACT

The intention is to specify a simplified design for a device which is used in vehicles for determining a vertical distance between a vehicle body and at least one vehicle wheel which is adjustably mounted thereon.

In the device according to the invention, a first inclination sensor which generates first inclination signals which are correlated to the inclination of the vehicle body with respect to a reference position, and transmits them to a control unit, is attached to the vehicle body. Attached to a coupling component which is adjusted, together with the vehicle wheel, relative to the vehicle body, is a second inclination sensor which generates second inclination signals which are correlated to the inclination of this coupling component with respect to a reference position, and transmits them to the control unit. The control unit then determines from the inclination signals of the inclination sensors a distance signal which is correlated to the vertical distance between the vehicle wheel and the vehicle body.

18 Claims, 5 Drawing Sheets

DEVICE FOR DETERMINING THE DISTANCE BETWEEN VEHICLE BODY AND VEHICLE WHEEL

CROSS REFERENCE TO RELATED APPLICATIONS

Priority is claimed under 35 U.S.C. §119 with respect to German Patent Application No. 199 04 908.4-21 filed on Feb. 6, 1999.

BACKGROUND OF THE INVENTION

The invention relates to a device in a road or rail vehicle for determining a vertical distance between a vehicle body and at least one vehicle wheel which is adjustably mounted thereon.

DE 31 34 115 C2 presents an air suspension system, in particular for motor vehicles, which has a wheel or axle level controller in which [lacuna] are activated directly or by means of piezoelectric, capacitive-electric or inductive-electric pressure elements and solenoid pressure control elements starting from a predefined deceleration value by means of a signal transmitter which brings about the control of the air pressure of, in each case, one air suspension element or of the air pressure of all the air suspension elements, is based on mass inertia and acts parallel to the underlying surface, which pressure elements and solenoid pressure control elements produce restoring moments by means of spring stiffening in order to maintain the vehicle at a certain level. The intention is that this air suspension system is to be used to compensate the changes in level which occur when the vehicle is operating when it is braking in a straight line, on a bend and when braking during cornering.

DE 196 45 897 A1 discloses a vehicle which has at least four vehicle wheels which are mounted on a vehicle body so as to be sprung in relation to it and have inflatable tyres. The known vehicle also has a device of the type mentioned at the beginning, each vehicle wheel being assigned a position sensor with which the distance between the respective vehicle wheel and the vehicle body can be determined. In the known vehicle, distance signals which are generated by the position sensors and are correlated to the distance values are used to detect an incorrect tyre pressure, for which purpose it is checked whether, averaged over time, the vehicle wheels lie approximately in a common plane.

However, usually a device of the type mentioned at the beginning is used for adjusting the level of the vehicle body in relation to the underlying surface on which the vehicle is located, appropriate level adjustment elements being assigned to the respective vehicle wheels. A level adjustment system is used, for example, to set continuously a constant distance between the vehicle body and underlying surface irrespective of the vehicle loading. Such a level control system produces advantages in the structural configuration of the spring stiffness of the vehicle suspension system. The constant ground clearance also results in constant camber values and toe angle values at the vehicle axles, said values being independent of the vehicle loading, which results in improved dynamic properties.

In addition, a level adjustment system can be used to set, within certain limits, any desired level of the vehicle body either arbitrarily or as a function of parameters. Such a level adjustment system can cause the level of the vehicle to be lowered, for example at high vehicle velocities, in order to reduce the aerodynamic drag. Likewise, there may be provision for the driver to raise the level of the vehicle on a poor underlying surface, in order to increase the ground clearance of the vehicle.

Furthermore, a level adjustment system can also be used to align the vehicle body parallel to the underlying surface independently of the respective loading state of the vehicle. In this context, the vehicle body can be aligned horizontally with respect to a longitudinal axis of the vehicle and/or with respect to a transverse axis of the vehicle. This parallel alignment of the vehicle body, also referred to as "levelling", relative to the underlying surface ensures that the vehicle is always in an optimum position when the vehicle is loaded asymmetrically. For example in the case of a passenger car, this makes it possible to ensure that dipped headlights always have an optimum, in particular non-dazzling, beam path.

Level adjustment devices can be restricted here to individual axles of a vehicle (for example rear-axle level adjustment) or relate to all the axles of the vehicle (for example all-round level adjustment).

The devices of the type specified at the beginning which are used in known level adjustment devices have actual value sensors which register the distance between the vehicle wheel and the vehicle body. Such an actual value sensor can be embodied, for example, as an inductive linear travel sensor or as a hydraulic or electric rotational angle sensor and is then coupled, in the first instance, to the vehicle body and, in the second instance, to a vehicle component (coupling component) which is adjusted, together with the vehicle wheel, relative to the vehicle body. Such a coupling component can be, for example, an axle link of an associated wheel suspension element. In the case of the actual value sensors which are embodied as rotational angle sensors, it is also necessary to have a mechanical transmission element which couples the rotation angle sensor to the coupling component which is to be tapped. For this reason, the known devices of the type mentioned at the beginning are usually of complex design.

The present invention is concerned with the problem of specifying a different expedient embodiment, which has a simplified design, for a device of the type mentioned at the beginning.

SUMMARY OF THE INVENTION

The present invention is based on the general idea of using an inclination sensor which is assigned to the vehicle body (vehicle-body-related inclination sensor) to determine an angle of inclination of the vehicle body with respect to a reference position, and to use an inclination sensor which is assigned to the respective vehicle wheel (wheel-related inclination sensor) to determine an angle of inclination of the vehicle wheel or of a coupling component which couples the vehicle wheel to the vehicle body, with respect to a reference position. The current angle of inclination of the vehicle wheel or of a coupling component relative to the vehicle body can then be determined from a combination of the inclination values which are determined for the vehicle body and for the respective vehicle wheel. This angle of inclination of the vehicle wheel and/or of the coupling component with respect to the vehicle body can then be used to determine, for example computationally, the current vertical distance between the respective vehicle wheel and the vehicle body. In contrast to the prior art, in which an actual value sensor is coupled, in the first instance, to the vehicle body and, in the second instance, to the vehicle wheel or the coupling component, in order to measure, by means of relative movements between the vehicle wheel or the coupling component and the vehicle body, a value which is correlated to the vertical distance between the vehicle body and vehicle wheel, the device according to the invention exhibits two inclination sensors, one of which is attached to the vehicle body and the other of which is attached to the vehicle wheel or coupling component, in order to calculate, from the inclination values of the inclination sensors, a value which is correlated to the vertical distance between the vehicle body and the vehicle wheel.

The use of the device according to the invention produces the following advantages for installation in a motor vehicle: because the inclination sensors are attached directly to the vehicle body and to the vehicle wheel and/or to the coupling component, additional transmission elements can be dispensed with, with the result that the number of components and thus the costs and the weight of the device are relatively low. Furthermore, inclination sensors can be of relatively small design, with the result that the necessary installation space for the sensors in the vicinity of the axle casing or wheel casing is low, in particular free travel for the kinematics of a conventional actual value sensor which is coupled to the vehicle body and to the wheel and/or to the coupling component can be dispensed with. In conventional actual value sensors, it has been necessary to carry out a level standardization after their installation in order to compensate installation tolerances when positioning the actual value sensors, and in order to compensate manufacturing tolerances of the actual value sensors. Such a level standardization can be dispensed with when the inclination sensors are used, since the inclination sensors can be standardized in terms of their output signal with adequate precision during manufacture, and because the inclination sensors can be positioned and installed on the vehicle body and on the respective coupling component with sufficiently tight tolerances. Furthermore, the device according to the invention provides the possibility of making available current level information by means of the control unit of the device. This information can then be used, for example, in a workshop or in the final mounting stage of the vehicle, for adjusting and checking the axles, for example for a camber and toe angle adjustment, without an external inclination angle measuring instrument being required, as in the past, to determine the level.

In the invention, the control unit for generating the distance signal from the vehicle-body-related inclination signal and the wheel-related inclination signal forms a differential signal and assigns a vertical distance between the vehicle wheel and the vehicle body to said signal and generates the distance signal which is correlated to this vertical distance. This assignment between the differential signal and vertical distance is preferably recorded in the manner of a characteristic diagram and stored in the control unit. Such characteristic-diagram-type assignments can be implemented easily and have proven invaluable in practice in other technological fields, in particular as a result of their reliability.

The coupling component to which the wheel-related inclination sensor is attached is preferably a constituent part of a wheel suspension system which supports the vehicle wheel on the vehicle body, in particular this component is an axle link, for example a transverse link or a semi-trailing arm axle, or a torsion bar of a torsion-bar suspension system or a torsion bar of a torsion-bar transverse stabilizer. In other words, the wheel-related inclination sensor is attached to a component which is present on the vehicle in any case, with the result that no additional expenditure is required in this respect.

According to one development of the device according to the invention, said device, or its control unit, can be coupled to a level adjustment device of the vehicle or integrated into such a device, said level adjustment device having appropriate level adjustment elements which are each assigned to one of the vehicle wheels. The level adjustment device here processes the distance signals of the control unit and can carry out, as a function thereof, a level adjustment of the vehicle body in relation to an underlying surface, for example road or rail. Depending on how many vehicle wheels are equipped with a wheel-related inclination sensor, and depending on whether a vehicle-body-related inclination signal which is generated by a common vehicle-body-related inclination sensor is used for all the wheel-related inclination signals, or whether a separate vehicle-body-related inclination sensor is provided for each axle, the vehicle-body-related inclination signal of which sensor is used for processing the wheel-related inclination signals which are assigned to the wheels of this axle, it is possible to use the level adjustment device to adjust the vehicle body to a predefined level and/or set the vehicle body to a predefined level and/or align to the vehicle body parallel to a transverse direction of the underlying surface lying in a transverse plane of the vehicle which contains the transverse direction of the vehicle (levelling with respect to the longitudinal axis of the vehicle), and/or to align the vehicle body parallel to a longitudinal direction of the underlying surface lying in a longitudinal plane of the vehicle which contains the longitudinal direction of the vehicle (levelling with respect to the transverse axis of the vehicle).

Further important features and advantages of the device according to the invention result from the subclaims, from the drawings and from the associated description of the figures with reference to the drawings.

Of course, the features which are mentioned above and those which will be explained below can be used not only in the respectively specified combination but also in other combinations or in isolation without departing from the scope of the present invention.

BRIEF DESCRIPTION OF THE DRAWINGS

Preferred exemplary embodiments of the invention are illustrated in the drawings and will be explained in more detail in the following description. In said drawings, the following figures each show schematic views.

DETAILED DESCRIPTION OF THE PREFERRED EMBODIMENT

Figure 1:
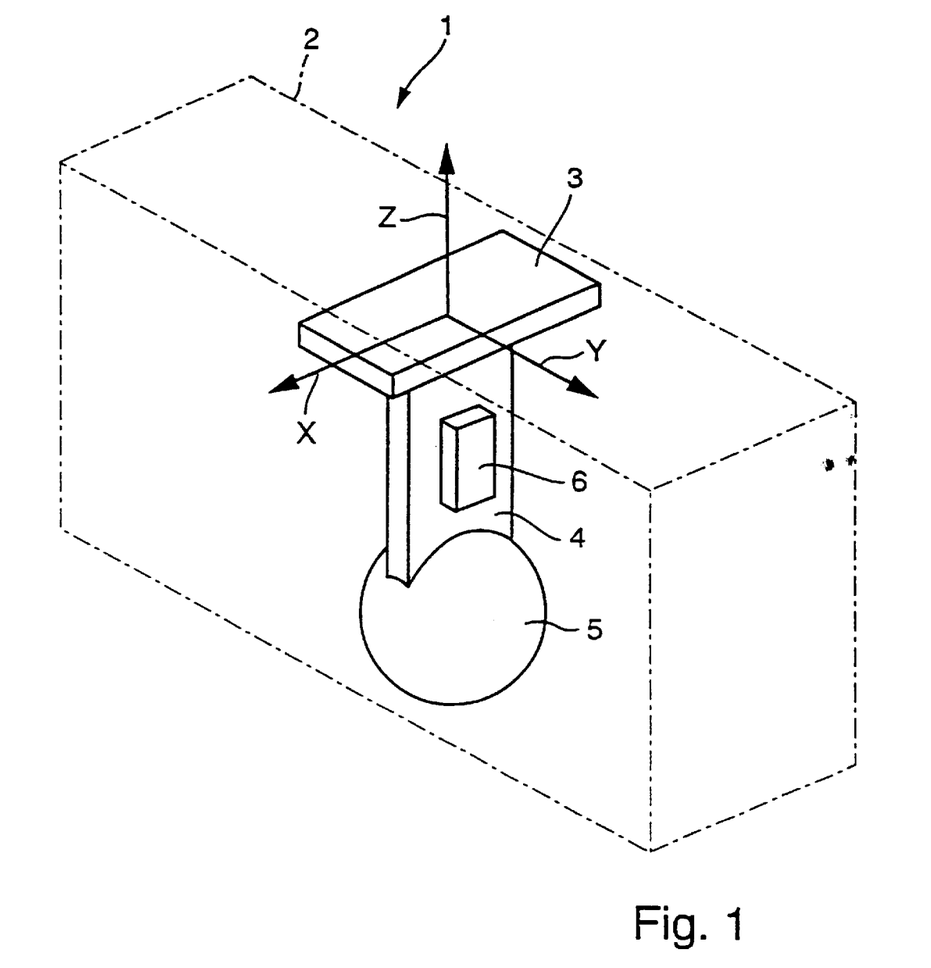
FIG. 1 shows a perspective view of the design of an inclination sensor which is designed as an electric pendulum.

According to FIG. 1, an inclination sensor 1 which is designed as an electric pendulum has a casing 2 in which a supporting plate 3 is mounted. The supporting plate 3 is fitted on its underside with a flexurally elastic flexible carrier 4 which has on its end facing away from the supporting plate 3 a weight 5 which is represented by a sphere. A strain gauge 6 is attached to at least one outer side of the flexible carrier 4, which strain gauge 6 can be used to convert flexural deformations of the flexible carrier 4 into electrical signals. For this purpose, it is possible to accommodate appropriate signal converters in the casing 2 of the inclination sensor 1. The inclination sensor 1 which is illustrated in FIG. 1 has an internal coordinate system with the coordinate directions X, Y and Z which are at right angles to one another.

Owing to the shape selected for the flexible carrier 4 in the case of the inclination sensor 1 which is illustrated here by way of example, said inclination sensor 1 is particularly suitable for registering flexural deformations of the flexible carrier 4 about the X axis, i.e. this inclination sensor 1 is particularly sensitive to forces acting in the Y direction. Correspondingly, the strain gauge 6 is also attracted to the flexible carrier 4 in such a way that it senses the flexural deformations on the X axis. Accordingly, forces acting on said inclination sensor 1 can be sensed by the strain gauge 6 only if these forces run in the direction of the Y coordinate, or have at least one force component running in the Y direction. The inclination sensor 1 which is described here accordingly has a considerably greater measurement sensitivity in the Y direction than in the X direction and in the Z direction. However, the present invention is not restricted to the use of such a sensor; any other desired inclination sensors can also be used, in particular those sensors whose sensitivity is equally great in the X direction and Y direction and in particular also in the Z direction.

The signal which is generated by the inclination sensor 1 thus depends on the forces acting on the inclination sensor 1. If the inclination sensor 1 is mounted in a vehicle, a (resulting) force acting on said vehicle is composed of the force of gravity, owing to the acceleration of the earth, and of inertial forces which arise owing to acceleration of the vehicle, for example when cornering or starting up or braking. The signal which is generated by the inclination sensor 1 on the basis of this resulting force depends here on the orientation of the resulting force with respect to the sensor-internal coordinate system X, Y, Z. In the case of the inclination sensor 1 which is illustrated by way of example, this dependence results from the increased measurement sensitivity in the Y direction. In this case, the inclination sensor 1 generates inclination signals which correlate to the inclination of the XY plane of the sensor 1 with respect to a reference plane which is preferably formed by a horizontal plane which is perpendicular to gravity.

Figure 2:
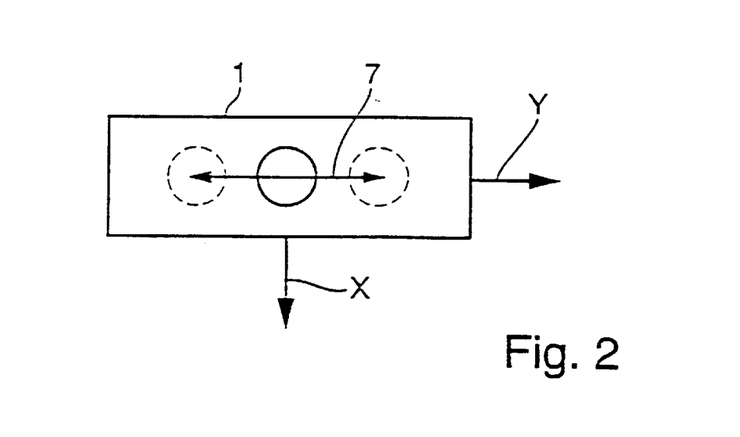
FIG. 2 shows a plan view of a symbolic representation of the inclination sensor from FIG. 1.

FIG. 2 shows a plan view of a symbol which represents the inclination sensor 1 illustrated in FIG. 1 and which is used in FIGS. 3 to 9 to represent the inclination sensor 1. It should be noted here that a double arrow 7 which is arranged in the inclination sensor symbol 1 represents the direction of sensitivity of the inclination sensor 1, i.e. the direction of the Y coordinate in the sensor's XYZ coordinate system.

The present invention is based, inter alia, on the following fact: if the relative position of a first component is to be monitored with respect to a second component, one of these inclination sensors 1 is attached to both components, which inclination sensor 1 generates in each case an (absolute) inclination signal which is correlated to an (absolute) angle of inclination of the component with respect to the reference position. By comparing these (absolute) inclination signals, for example by forming a differential signal, it is possible to assign the components a certain (relative) angle of inclination, i.e. a relative position, with respect to one another. If the two components are subjected to acceleration in the same way, for example if the components are located on a vehicle, the inclination signals of the two inclination sensors change in the same way, with the result that the differential signal continues to permit conclusions to be drawn with respect to the relative position between the two components. However, if the same inertial forces act on the two inclination sensors 1, a comparison of the inclination signals merely permits "changes" of the force of gravity acting on the sensors 1 to be registered. Because the force of gravity on the earth can be assumed to be constant, the inclination sensor can change only if the spatial position of the inclination sensor 1 relative to the direction of action of the force of gravity changes. In the inclination sensor 1 which is illustrated in FIG. 1 and which has a measurement sensitivity which is marked in the Y direction, this means that the inclination sensor 1 is used to register the angular position of the inclination sensor 1 with respect to the X coordinate, and/or the angle of inclination of the inclination sensor 1 with respect to a plane running parallel to the X coordinate, for example XY plane. Because the signal which is generated by the inclination sensor 1 thus correlates to the angle of inclination of the inclination sensor 1, it is justified to refer to this signal as the "inclination signal".

If the spatial alignment of the two components relative to one another is known by means of the inclination sensors, it is possible to use the corresponding information to calculate, for example, the distance between the components, by means of their geometrical arrangement. For this reason, in the case of the present invention, a first inclination sensor 1 is attached to the vehicle body, and a second inclination sensor is attached to the vehicle wheel and/or to the coupling component. The relative position between this coupling component and the vehicle body can then be used to calculate without difficulty the vertical distance between the vehicle wheel and the vehicle body given known geometry.

FIGS. 3 to 9 respectively show a passenger car or a vehicle body 8 which has, in relation to a longitudinal direction 10 of a vehicle, a left-hand vehicle front wheel 11 and a right-hand vehicle front wheel 12 on a front axle 9, and a left-hand vehicle rear wheel 14 and a right-hand vehicle rear wheel 15 on a rear axle 13. The vehicle wheels 11, 12, 14, 15 are each mounted on the vehicle body 8 so as to be capable of pivoting about a pivot axis 17 running parallel to the longitudinal direction 10 of the vehicle, by means of axle links 16 which are designed here as transverse links. The axle link 16 thus forms a coupling component which is adjusted together with the respective vehicle wheel 11, 12, 14, 15, it being possible to assign a different angle of inclination between the axle link 16 and the vehicle body 8 to each vertical distance between the vehicle wheel 11, 12, 14, and 15 and vehicle body 8.

The vehicle which is illustrated in FIGS. 3 to 9 is equipped in each case with a level adjustment device which comprises level adjustment elements 18 which engage on the respective axle link 16 and bring about a pivoting adjustment of the axle link 16, as a result of which a vertical distance between the respective vehicle wheel 11, 12, 14 and 15 and the vehicle body 8 changes. The level adjustment elements 18 are merely represented symbolically in FIGS. 3 to 9 for the sake of illustration: in particular, their direction of action in the illustrations does not correspond to reality in which this direction of action runs essentially perpendicularly to the plane of the drawing. The level adjustment elements 18 operate hydraulically or pneumatically and are each connected to a pressure side of the pump 20 via an adjustment valve 19. The pump 20 feeds, for example, hydraulic medium, permanently or according to demand, from a hydraulic medium reservoir 21 which is closed on the intake side. Hydraulic medium which is not required can be fed back here into the hydraulic medium reservoir 21 via an outlet valve 22. A control unit 23 actuates the level adjustment valves 19 by means of output-related control lines 24, and the outlet valve 22 by means of an output-related control line 25, and the pump 20 by means of an output-related control line 26, and thus activates the respective level adjustment elements 18 in order to increase or decrease the vertical distance between the respective vehicle wheel and the vehicle body 8.

Figure 3:
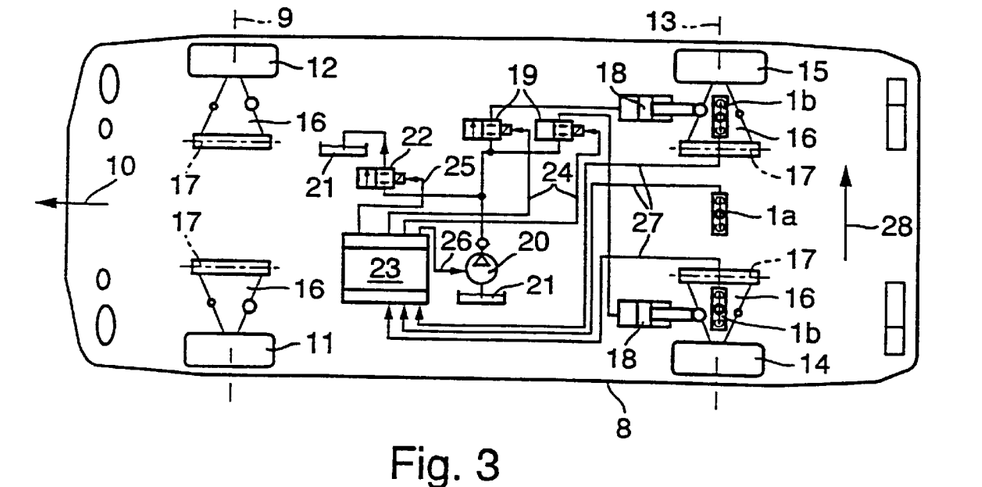
FIG. 3 shows a wiring-diagram-like plan view of a passenger car which is equipped with a first embodiment of the device according to the invention.
Figure 4:
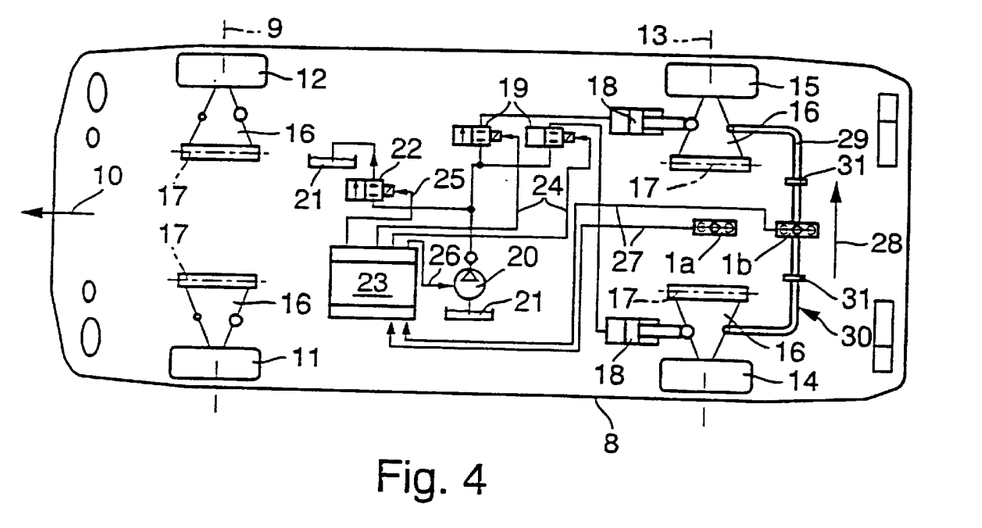
FIG. 4 shows a similar view to that in FIG. 3, but of a second embodiment of the device according to the invention.

While the vehicles in FIGS. 3 and 4 only have rear-axle level adjustment, the vehicles in FIGS. 5 to 9 have all-round level adjustment.

Each of the vehicles illustrated in FIGS. 3 to 9 is equipped with the device according to the invention, which has at least two of the inclination sensors 1 described above, which inclination sensors 1 are each connected to the control unit 23 at the input end by means of a signalling line 27.

A controller of the device according to the invention determines from the inclination signals of the inclination sensors 1 a distance signal which is correlated to the vertical distance between the respective vehicle wheel and the vehicle body 8 and which can then be used for the level adjustment. As in the embodiments in FIGS. 3 to 9, this controller and its function can be integrated here into the control unit 23 of the level control device. An embodiment is also possible in which separate control units are provided for the device according to the invention and for the level control system, which units are appropriately connected to one another.

Individual exemplary variants of the device according to the invention are explained in more detail below:

According to FIG. 3, a first inclination sensor 1 is attached to the vehicle body 8. This vehicle-body-related inclination sensor 1 is referred to below as vehicle-body-related inclination sensor 1a. The left-hand rear wheel 14 and the right-hand rear wheel 15 are each assigned a separate inclination sensor 1 which is attached to the associated axle link 16. The inclination sensors 1 which are assigned to the respective vehicle wheel are each referred to below as a wheel-related inclination sensor 1b.

The wheel-related inclination sensors 1b are oriented in such a way that they can register the angle of inclination of the axle links 16, i.e. their direction 7 of measurement runs parallel to a transverse direction 28 of the vehicle. The wheel-related inclinations sensors 1b are expediently arranged here on the (virtual) rear axle 13. The vehicle-body-related inclination sensor 1a is preferably positioned in the longitudinal centre of the vehicle. In order to obtain a reference signal, the vehicle-related inclination sensor 1a is also aligned in the same way and preferably also arranged on the (virtual) rear axle 13. The wheel-related inclination sensors 1b which are assigned to the individual vehicle wheels 14, 15 generate inclination signals (wheel-related inclination signals) independently of one another for each wheel and transmit said inclination signals to the control unit 23 via the signalling lines 27. The vehicle-body-related inclination sensor 1a generates an inclination signal (vehicle-body-related inclination signal) which is assigned to the vehicle body 8, and said sensor 1a also transmits said signal to the control unit 23. In the control unit 23, the wheel-related-inclination signals which are assigned to the individual wheels are processed separately with the vehicle-body-related inclination signal, in order to be able to assign a respective vertical distance to each vehicle wheel 14, 15. The embodiment illustrated in FIG. 3 can thus be used to determine separately the vertical distances between the rear wheels 14, 15 and the vehicle body 8, with the result that, in addition to a level adjustment and level control of the rear axle 13, levelling of the vehicle body 8 with respect to the longitudinal direction 10 of the vehicle is also possible, i.e. the left-hand side of the vehicle and the right-hand side of the vehicle can be adjusted to the same distance from an underlying surface.

According to FIG. 4, the vehicle-body-related inclination sensor 1a is again arranged in the longitudinal centre of the vehicle on the virtual rear axle 13, but it is aligned here parallel to the longitudinal direction 10 of the vehicle. A common wheel-related inclination sensor 1b is assigned to the rear wheels 14 and 15, said inclination sensor 1b being attached to a torsion bar 29 of a torsion-bar transverse stabilizer 30. Such a torsion-bar transverse stabilizer acts symmetrically on the axle links 16 of both rear wheels 14 and 15 and is mounted on two bearings 31 on the vehicle body 8. Torsion-bar transverse stabilizers 30 of this kind are generally known and are therefore not described in more detail. Deflections of the rear wheels 14 and 15 bring about rotational adjustments of the torsion bar 29, as a result of which the spatial position of the wheel-related inclination sensor 1b which is attached to the torsion bar 29 changes. The inclination signal of the wheel-related inclination sensor 1b is a measure here of the average vertical distance between the rear wheels 14, 15 and the vehicle body 8, which is obtained as an average value from the individual vertical distances between the vehicle body 8 and the left-hand rear wheel 14 and the right-hand rear wheel 15. The wheel-related inclination sensor 1b is correspondingly attached to the torsion bar 29 in the longitudinal centre of the vehicle, aligned parallel with the longitudinal direction 10 of the vehicle. This embodiment of the device according to the invention can be used to adjust and set the average level of the rear axle 13 to a specific level.

Figure 5:
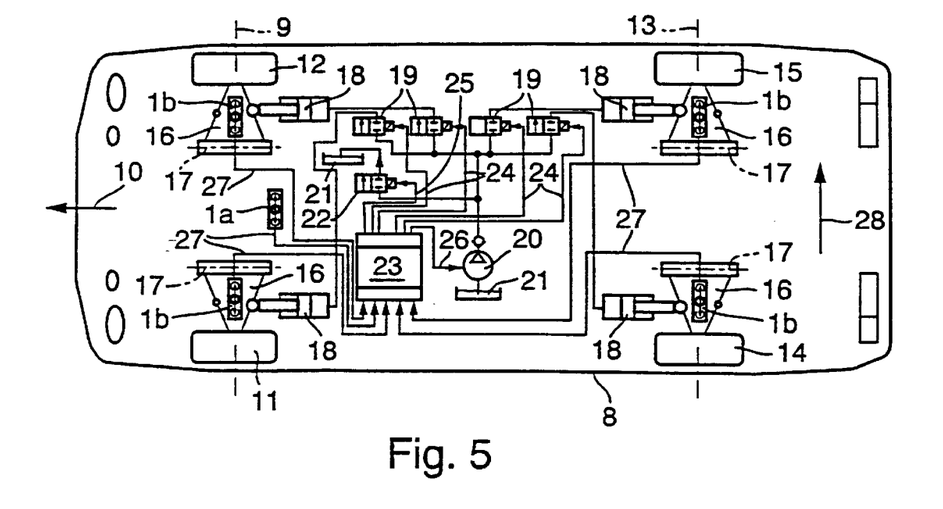
FIG. 5 shows a similar view to that in FIG. 3, but of a third embodiment of the device according to the invention.

According to FIG. 5, each vehicle wheel 11, 12, 14, 15 is assigned a separate, wheel-related inclination sensor 1b which is aligned in each case parallel to the transverse direction 28 of the vehicle and arranged on the virtual front axle 9 or rear axle 13. In addition, a single vehicle-body-related inclination sensor 1a is preferably attached to the vehicle body 8 in the centre of the vehicle, this inclination sensor 1 also being aligned parallel to the transverse direction 28 of the vehicle. This embodiment can also be used, analogously with the variant from FIG. 3, to determine the level separately for each wheel, with the result that level adjustments and level controls are possible both on the front axle 9 and on the rear axle 13. Furthermore, the vehicle body 8 can be aligned here parallel to the underlying surface, both with respect to the longitudinal direction 10 of the vehicle and with respect to the transverse direction 28 of the vehicle.

Figure 6:
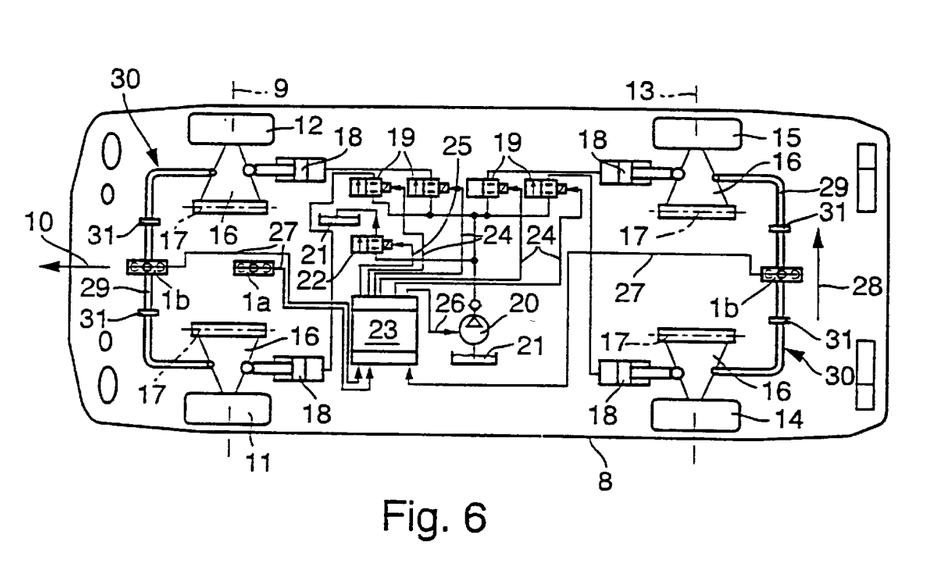
FIG. 6 shows a similar view to that in FIG. 3, but of a fourth embodiment of the device according to the invention.

According to FIG. 6, the front wheels 11, 12 are assigned a common front wheel-related inclination sensor 1b, and the rear wheels 14, 15 are assigned a common rear wheel-related inclination sensor 1b. These wheel-related inclination sensors 1b are attached here, analogously with the embodiment according to FIG. 4, to the torsion bar 29 of a front torsion-bar transverse stabilizer and that of a rear torsion-bar stabilizer 30. A vehicle-body-related inclination sensor 1a is preferably again attached to the vehicle body 8 in the centre of the vehicle. In the embodiment according to FIG. 6, the inclination sensors 1 are aligned parallel to the longitudinal direction 10 of the vehicle. The wheel-related inclination signal of the front wheel-related inclination sensor 1b can be used, in conjunction with the vehicle-body-related inclination signal of the vehicle-body-related inclination sensor 1a of the control unit 23, to calculate the average vertical distance between the front wheels 11, 12 and the vehicle body 8. In a corresponding way, the wheel-related inclination signal of the rear wheel-related inclination sensor 1b also yields the average vertical distance between the rear wheels 14, 15 and the vehicle body 8. In addition to an adjustment and control of the average level for the front axle 9 and for the rear axle 13, the embodiment according to FIG. 6 can also be used to carry out levelling or alignment of the vehicle body 8 with respect to the transverse direction 28 of the vehicle.

Figure 7:
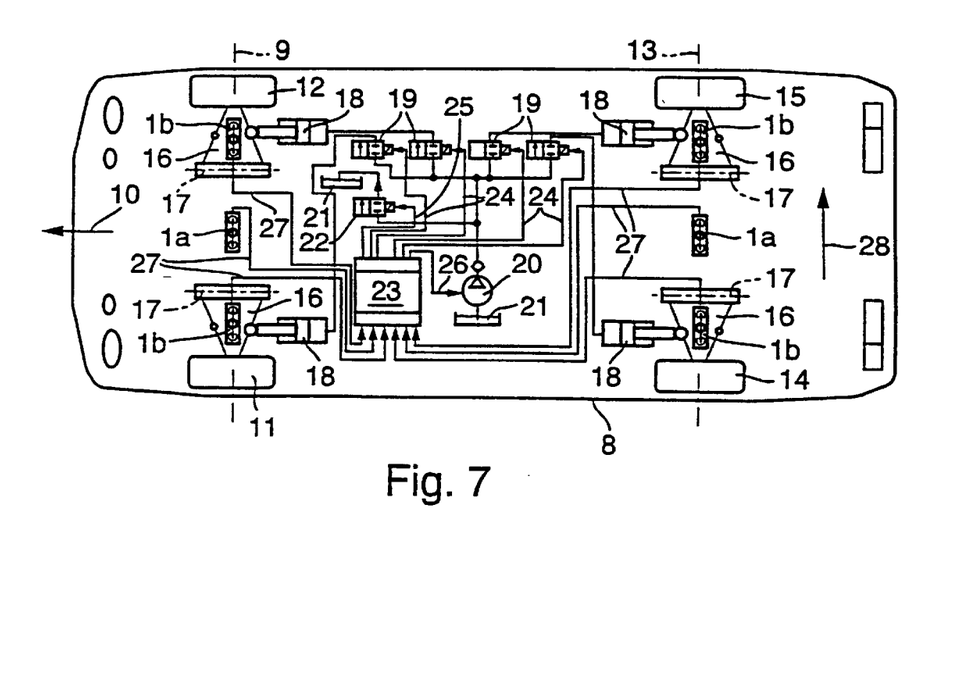
FIG. 7 shows a similar view to that in FIG. 3, but of a fifth embodiment of the device according to the invention.

According to FIG. 7, each vehicle wheel 11, 12, 14, 15 is assigned a separate wheel-related inclination sensor 1b which, aligned in each case parallel to the transverse direction 28 of the vehicle, is attached to the respective axle link 16 and arranged on the virtual front axle 9 or virtual rear axle 13. In addition, the front axle 9 and the rear axle 13 are each assigned a separate vehicle-body-related inclination sensor 1a which is attached to the vehicle body 8 and which is preferably arranged on the respective axle 9, 13 and aligned parallel to the transverse direction 28 of the vehicle and arranged in the longitudinal centre of the vehicle. In this embodiment, the control unit 23 determines, from the wheel-related inclination signals of the front wheel-related inclination sensors 1b in conjunction with the vehicle-body-related inclination signal of the front vehicle-body-related inclination sensor 1b, the vertical distances between the front wheels 11 and 12 and the vehicle body 8 separately. In a corresponding way, the control unit 23 determines separately, from the wheel-related inclination signals of the rear wheel-related inclination sensors 1b in conjunction with the vehicle-body-related inclination signal of the rear vehicle-body-related inclination sensor 1b, the vertical distances between the rear vehicle wheels 14, and the vehicle body 8. This arrangement can be used to adjust to and set a desired level for both axles 9, 13, and to align the vehicle body 8 with respect to the longitudinal direction 10 of the vehicle and the transverse direction 28 of the vehicle. Furthermore, even driving states in which the transverse acceleration at the front axle 9 and at the rear axle 13 are different from one another, for example if the vehicle is understeering or oversteering to an extreme degree when cornering, fail to have any effect on the determination of the distance for the individual vehicle wheels because each vehicle axle 9, 13 is assigned a separate, vehicle-related inclination sensor 1a.

Figure 8:
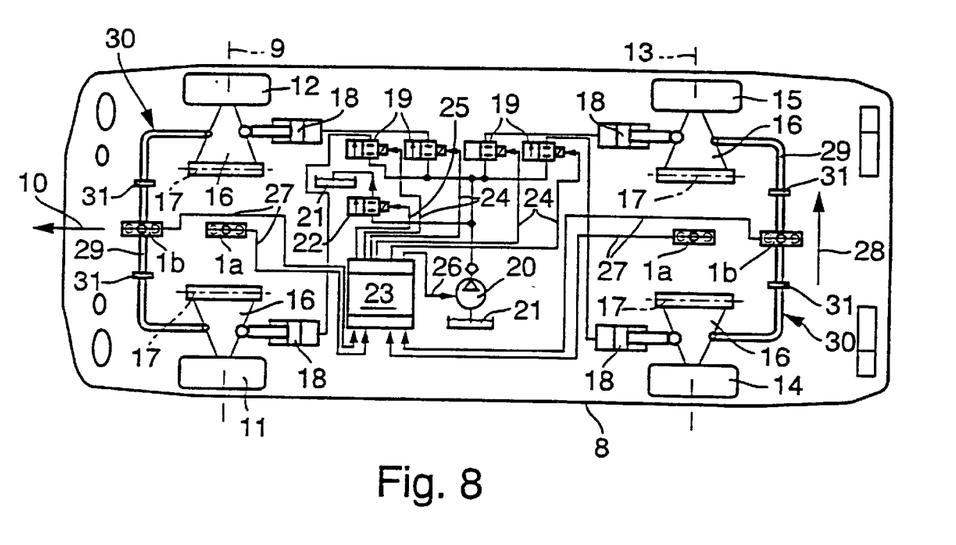
FIG. 8 shows a similar view to that in FIG. 3, but of a sixth embodiment of the device according to the invention.

According to FIG. 8, the wheels 11, 12 of the front axle 9 and the wheels 14, 15 of the rear axle 13 are each assigned a common wheel-related inclination sensor 1b, which sensors are each attached to the centre of the torsion bar 29, which is assigned to the respective axle 9, 13, and parallel to the longitudinal direction 10 of the vehicle. Each axle 9, 13 is also assigned a separate vehicle-body-related inclination sensor 1a which is attached to the vehicle body 8 on the respective axle 9, 13 in the longitudinal centre of the vehicle, parallel to the longitudinal direction 10 of the vehicle. The average level of the front axle 9 is determined here from the wheel-related inclination signal of the front wheel-related inclination sensor 1b in conjunction with the vehicle-body-related inclination signal of the front vehicle-body sensor 1a. Independently of this, the average level of the rear axle 13 is determined from the wheel-related inclination signals of the rear wheel-related inclination sensor 1b in conjunction with the vehicle-body-related inclination signal of the rear vehicle-body-related inclination sensor 1a. Owing to the separate vehicle-body-related inclination sensors 1a for the front axle 9 and for the rear axle 13, different transverse acceleration values at the front axle 9 and at the rear axle 13 do not have any influence on the determination of the front axle level or of the rear axle level. The embodiment according to FIG. 8 permits the average level of the front axle 9 and of the rear axle 13 to be adjusted and set, and also permits the vehicle body 8 to be levelled with respect to the transverse direction 28 of the vehicle.

Figure 9:
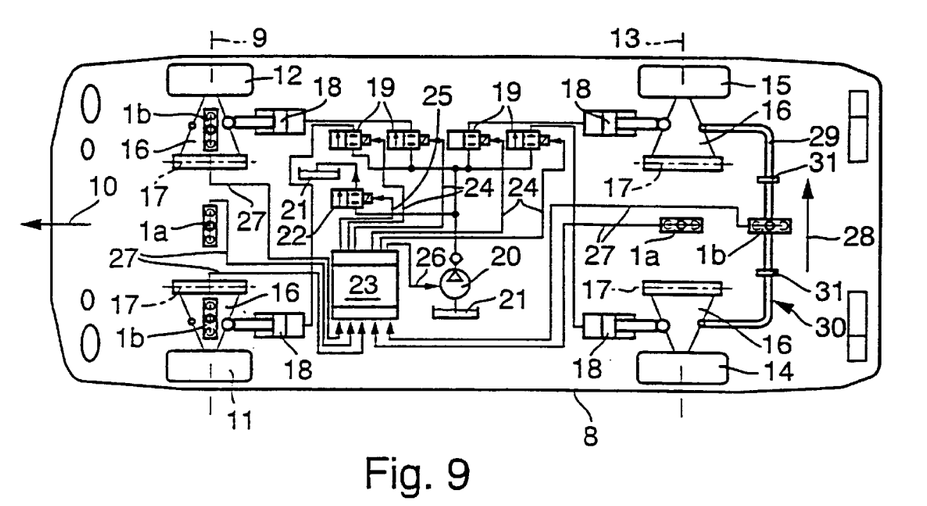
FIG. 9 shows a similar view to that in FIG. 3, but of a seventh embodiment of the device according to the invention.

As is clear from FIG. 9, different sensor arrangements can be also used for the front axle 9 and the rear axle 13. By way of example, in FIG. 9, an arrangement for the front axle 9 with separate wheel-related inclination sensors 1b is represented for the two front wheels 11 and 12 which are attached to the respective axle length 16. The front axle 9 is assigned a front vehicle-body-related inclination sensor 1a. The inclination sensors 1 of the front axle 9 are arranged on it and aligned parallel to the transverse direction 28 of the vehicle. The front vehicle-body-related inclination sensor 1a is arranged centrally with respect to the vehicle body 8. In contrast with this, the two front wheels 14 and 15 are assigned a common wheel-related inclination sensor 1b which is attached to the corresponding torsion bar 29. The rear axle 13 is also assigned a separate vehicle-body-related inclination sensor 1a which is attached to the vehicle body 8 on the axle 13 at the longitudinal centre of the vehicle. The inclination sensors 1 of the rear axle 13 are aligned in parallel with the longitudinal direction of the vehicle. This embodiment can also be used to carry out not only level adjustment and level control of the front axle 9 and of the rear axle 13 but also alignment of the vehicle body 8 parallel to the underlying surface both with respect to the longitudinal direction 10 of the vehicle and with respect to the transverse direction 28 of the vehicle. The sensor arrangement which is assigned to the front axle 9 in FIG. 9 can, in another embodiment of the invention, be interchanged with the sensor arrangement assigned to the rear axle 13.

Although the invention has been described for a dual-axle passenger car, the invention can also be used in other road or rail vehicles, even with more than two axles.

The foregoing discussion discloses and describes merely exemplary embodiments of the present invention. One skilled in the art will readily recognize from such discussion, and from the accompanying drawings and claims, that various changes and modifications can be made therein without departing from the spirit and scope of the invention as defined in the following claims.

What is claimed is:

1. A device for determining a vertical distance between a body of a vehicle and at least one wheel adjustably mounted thereto, said vehicle including a coupling component coupled to said wheel and to said body such that a change in the vertical distance between said wheel and body causes the relative position of said coupling component to change with respect to said body, said device comprising:

a first inclination sensor attached to the vehicle body, said first sensor generating first inclination signals indicative of the inclination of the vehicle body with respect to a reference plane;

a second inclination sensor attached to said coupling component, said second sensor generating second inclination signals indicative of the inclination of said coupling component with respect to said reference plane; and a control unit for receiving said first and second inclination signals transmitted by said inclination sensors, wherein said control unit determines from said first and second inclination signals a distance signal which is correlated to the vertical distance between the vehicle wheel and the vehicle body, wherein said control unit determines a differential signal and assigns a said vertical distance to said differential signal correlated to that vertical distance.

2. The device according to claim 1 wherein said assignment between said differential signal and said vertical distance is recorded as a characteristic diagram and stored in said control unit.

3. The device according to claim 1 wherein said vehicle includes a suspension system which supports the vehicle wheel on the vehicle body and wherein said coupling component is a component of said suspension system.

4. The device according to claim 3 wherein said suspension system component is an axle link.

5. The device according to claim 3 wherein said suspension system is a torsion bar system and said suspension system component is a torsion bar.

6. The device according to claim 3 where said suspension system is a torsion bar system and said suspension system component is a torsion bar transverse stabilizer.

7. The device according to claim 6 wherein said vehicle includes at least one axle and said second inclination sensor is assigned to said axle.

8. The device according to claim 7 wherein said axle is coupled between a pair of wheels and wherein said second inclination sensor is assigned to one of said wheels and wherein said device further comprises a third inclination sensor assigned to said second wheel.

9. The device according to claim 1 wherein said vehicle includes two axles and wherein said axles are assigned a common inclination sensor.

10. The device according to claim 1 wherein said vehicle includes two axles and wherein said device includes a third inclination sensor, said second and third inclination sensors being assigned to said first and second axles, respectively.

11. The device according to claim 1 wherein said vehicle includes a level adjustment device having level adjustment elements assigned to each of the vehicle's wheels, said level adjustment device processing the distance signals and carrying out the function of adjusting the level of the vehicle with respect to an underlying road or rail.

12. The device according to claim 11 wherein said control unit is coupled to said level adjustment device.

13. The device according to claim 11 wherein said control unit is integrated into said level adjustment device.

14. A method for controlling a level adjustment device in a motor vehicle wherein said vehicle includes a coupling component coupled between the vehicle wheel and the vehicle body such that a change in the vertical distance between the wheel and the body causes the relative position of the coupling component to change with respect to the vehicle body, and wherein said method comprises the steps of:

providing a first inclination sensor attached to the vehicle body, said first sensor generating first inclination signals indicative of the inclination of the vehicle body with respect to a reference plane;

providing a second inclination sensor attached to said coupling component, said second sensor generating second inclination signals indicative of the inclination of said coupling component with respect to said reference plane;

providing a control unit for receiving said first and second inclination signals from said inclination sensors, wherein said control unit determines from said first and second signals a distance signal indicative of the vertical distance between the vehicle wheel and the vehicle body; and controlling said vehicle leveling device based on an output from said control unit.

15. The method of claim 14 wherein said vehicle body is adjusted to a predetermined level.

16. The method of claim 14 wherein said vehicle body is set to a predefined level.

17. The method of claim 14 wherein the vehicle is aligned in parallel with a longitudinal direction of an underlying surface lying in a longitudinal plane of the vehicle which contains the longitudinal direction of the vehicle.

18. The method of claim 14 wherein the vehicle body is aligned in parallel with the transverse direction of the underlying surface lying in a transverse plane of the vehicle which contains the transverse direction of the vehicle.

* * * * *